United States Patent
Achour et al.

(10) Patent No.: US 11,876,298 B2
(45) Date of Patent: Jan. 16, 2024

(54) ACTIVE REDIRECTION DEVICES FOR WIRELESS APPLICATIONS

(71) Applicant: Metawave Corporation, Carlsbad, CA (US)

(72) Inventors: Maha Achour, Encinitas, CA (US); Taha Shahvirdi Dizaj Yekan, San Diego, CA (US)

(73) Assignee: Metawave Corporation, Carlsbad, CA (US)

( * ) Notice: Subject to any disclaimer, the term of this patent is extended or adjusted under 35 U.S.C. 154(b) by 0 days.

(21) Appl. No.: 17/531,580

(22) Filed: Nov. 19, 2021

(65) Prior Publication Data

US 2022/0158363 A1    May 19, 2022

Related U.S. Application Data

(60) Provisional application No. 63/116,145, filed on Nov. 19, 2020.

(51) Int. Cl.
*H01Q 3/46*    (2006.01)
*H01Q 21/29*   (2006.01)
*H04B 7/155*   (2006.01)
*H01Q 15/14*   (2006.01)

(52) U.S. Cl.
CPC ............. *H01Q 21/29* (2013.01); *H01Q 15/14* (2013.01); *H04B 7/15507* (2013.01)

(58) Field of Classification Search
CPC ...... H01Q 21/29; H01Q 15/14; H01Q 15/148; H04B 7/15507
See application file for complete search history.

(56) References Cited

U.S. PATENT DOCUMENTS

| | | | |
|---|---|---|---|
| 9,923,281 B2 * | 3/2018 | Maruyama | H01Q 13/085 |
| 2012/0105305 A1 | 5/2012 | Maruyama et al. | |
| 2013/0229296 A1 | 9/2013 | Maruyama et al. | |
| 2015/0015455 A1 | 1/2015 | Maruyama et al. | |
| 2015/0022414 A1 | 1/2015 | Maruyama et al. | |
| 2015/0061966 A1 | 3/2015 | Maruyama et al. | |
| 2015/0070246 A1 | 3/2015 | Maruyama et al. | |
| 2015/0102973 A1 * | 4/2015 | Hand | H01Q 7/00 |
| | | | 343/837 |
| 2015/0229029 A1 | 8/2015 | Maruyama et al. | |
| 2021/0249778 A1 * | 8/2021 | Achour | H01Q 21/065 |

FOREIGN PATENT DOCUMENTS

| | | |
|---|---|---|
| JP | 5352645 B2 | 11/2013 |
| JP | 5355000 B2 | 11/2013 |
| JP | 5372118 B2 | 12/2013 |
| JP | 5398858 B2 | 1/2014 |
| JP | 5410558 B2 | 2/2014 |
| JP | 5410559 B2 | 2/2014 |
| JP | 5480855 B2 | 4/2014 |

* cited by examiner

*Primary Examiner* — Awat M Salih

(57) ABSTRACT

Examples disclosed herein relate to a meta-structure based active reflectarray for passive and active reflection. A control module is coupled to reflection elements to provide energy and change the phase of the elements.

19 Claims, 13 Drawing Sheets

US 11,876,298 B2

ACTIVE REDIRECTION DEVICES FOR WIRELESS APPLICATIONS

INCORPORATION BY REFERENCE

This application for patent incorporates by reference in its entirety the U.S. Patent Application No. 62/926,404 entitled "META-STRUCTURE BASED REFLECTARRAYS PROVIDING A PLURALITY OF BEAMS FOR ENHANCED 5G APPLICATIONS", filed Oct. 25, 2019.

CROSS-REFERENCE TO RELATED APPLICATIONS

This application claims priority from U.S. Provisional Application No. 63/116,145, titled "Active Reflectarrays For Wireless Applications," filed on Nov. 19, 2020, and incorporated herein by reference in its entirety.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, new wireless standards have been designed for deployment in the near future. A large development in wireless technology is the fifth generation of cellular communications ("5G") which encompasses more than the current Long-Term Evolution ("LTE") capabilities of the Fourth Generation ("4G") and promises to deliver high-speed Internet via mobile, fixed wireless and so forth. The 5G standards extend operations to millimeter wave bands, which cover frequencies beyond 6 GHz, and to planned 24 GHz, 26 GHz, 28 GHz, and 39 GHz up to 300 GHz, all over the world, and enable the wide bandwidths needed for high speed data communications.

The millimeter wave ("mm-wave") spectrum provides narrow wavelengths in the range of ~1 to 10 millimeters that are susceptible to high atmospheric attenuation and have to operate at short ranges (just over a kilometer). In dense-scattering areas with street canyons and in shopping malls for example, blind spots may exist due to multipath, shadowing and geographical obstructions. In remote areas where the ranges are larger and sometimes extreme climatic conditions with heavy precipitation occur, environmental conditions may prevent operators from using large array antennas due to strong winds and storms. These and other challenges in providing millimeter wave wireless communications for 5G networks impose ambitious goals on system design, including the ability to generate desired beam forms at controlled directions while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

A variety of active infrastructure elements for enhanced 5G applications are disclosed. The infrastructure elements are suitable for many different 5G applications and can be deployed in a variety of environments and configurations. As used herein, active redirection devices may include reflectarrays, repeaters or other structures for redirecting wireless transmissions, and is not limited to any specific type of device. These active redirection devices may be an array of patch antennas or other structures. A beam control module adjusts the beam directions and shapes the beams to enable a variety of spatial arrangements of base station radios and user equipment or mobile stations.

In various examples, Meta-Structure (MTS) based reflectarrays are arrays of cells having meta-structure reflector elements that reflect incident radio frequency ("RF") signals in specific directions. A meta-structure, as generally defined herein, is an engineered, non- or semi-periodic structure that is spatially distributed to meet a specific phase and frequency distribution. A meta-structure reflector element is designed to be very small relative to the wavelength of the reflected RF signals. These reflectarrays are able to operate at the higher frequencies required for 5G and at relatively short distances. Their design and configuration are driven by geometrical and link budget considerations for a given application or deployment, whether indoors or outdoors.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
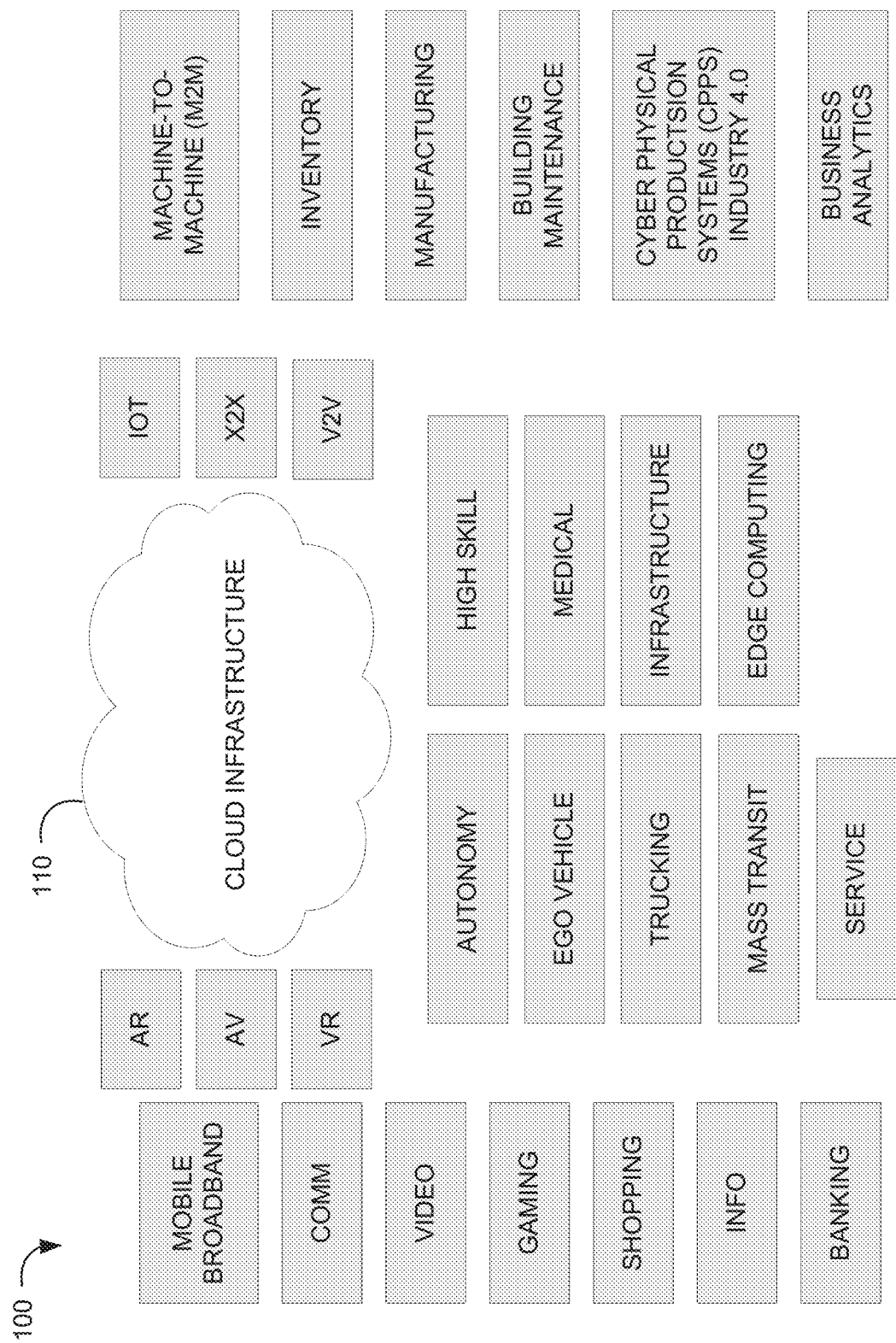
FIG. 1 is a diagram of a web of connectivity supporting directed wireless transmissions, such as 5G cellular networks.

FIG. 1 illustrates a web of connections 100 supported by a cloud infrastructure 110. As more and more devices and applications rely on wireless communications, the cloud infrastructure 110 is developing and expanding. Some of the current applications are identified in FIG. 1, and while this is not an exhaustive listing, the complexity, breadth and depth of requirements and specifications is growing exponentially.

To support and satisfy the applications and requirements of FIG. 1 requires new and innovative solutions, such as for infrastructure. To achieve download speeds and data throughput, the radio networks are moving to directed beams and multiple input-multiple output (MIMO) designs. This requires methods and apparatuses to communicate signals from end users to the cloud and throughout the web of connections.

Figure 2:
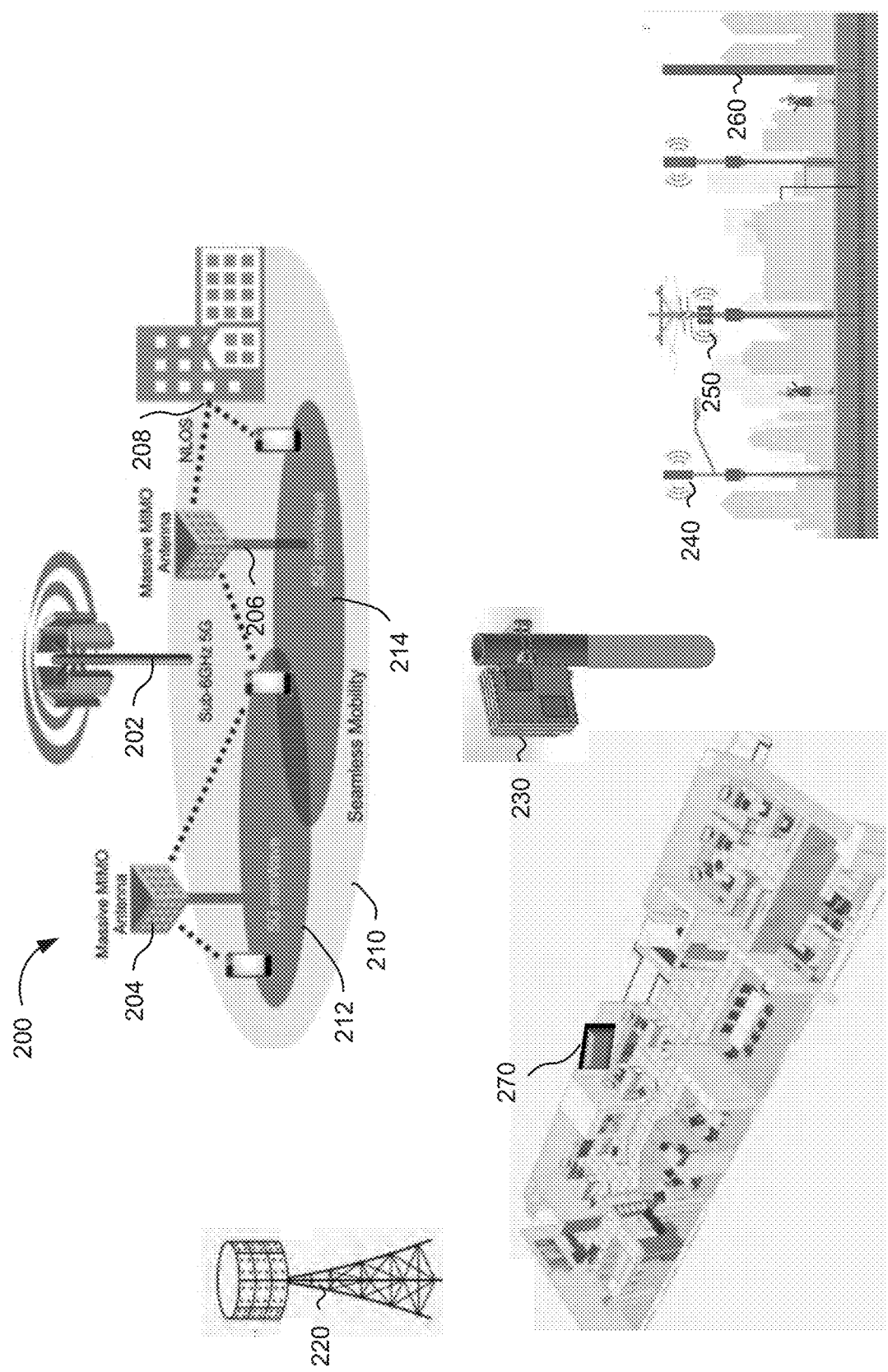
FIG. 2 illustrates various infrastructure elements to supported directed wireless transmission.

FIG. 2 illustrates some infrastructure apparatuses and methods applicable to 5G communications. In system 200, a 5G radio transmitter 202 is designated to provide coverage to area 210. Within area 210 there are multiple areas that require additional infrastructure, such as building 208 having non-line of sight (NLOS) areas. In addition to the 5G transmitter, also referred to as gNodeB or gNB, there are two MIMO antennas 204, 206 supporting coverage areas 212, 214, respectively. For NLOS areas, a reflector or reflectarray 270 may be positioned to redirect signals. A repeater device 230 may be used to inject gain into signals. Along a roadway or train track, different components are used, such as 240, 250 and 260 to extend signal coverage.

Figure 3:
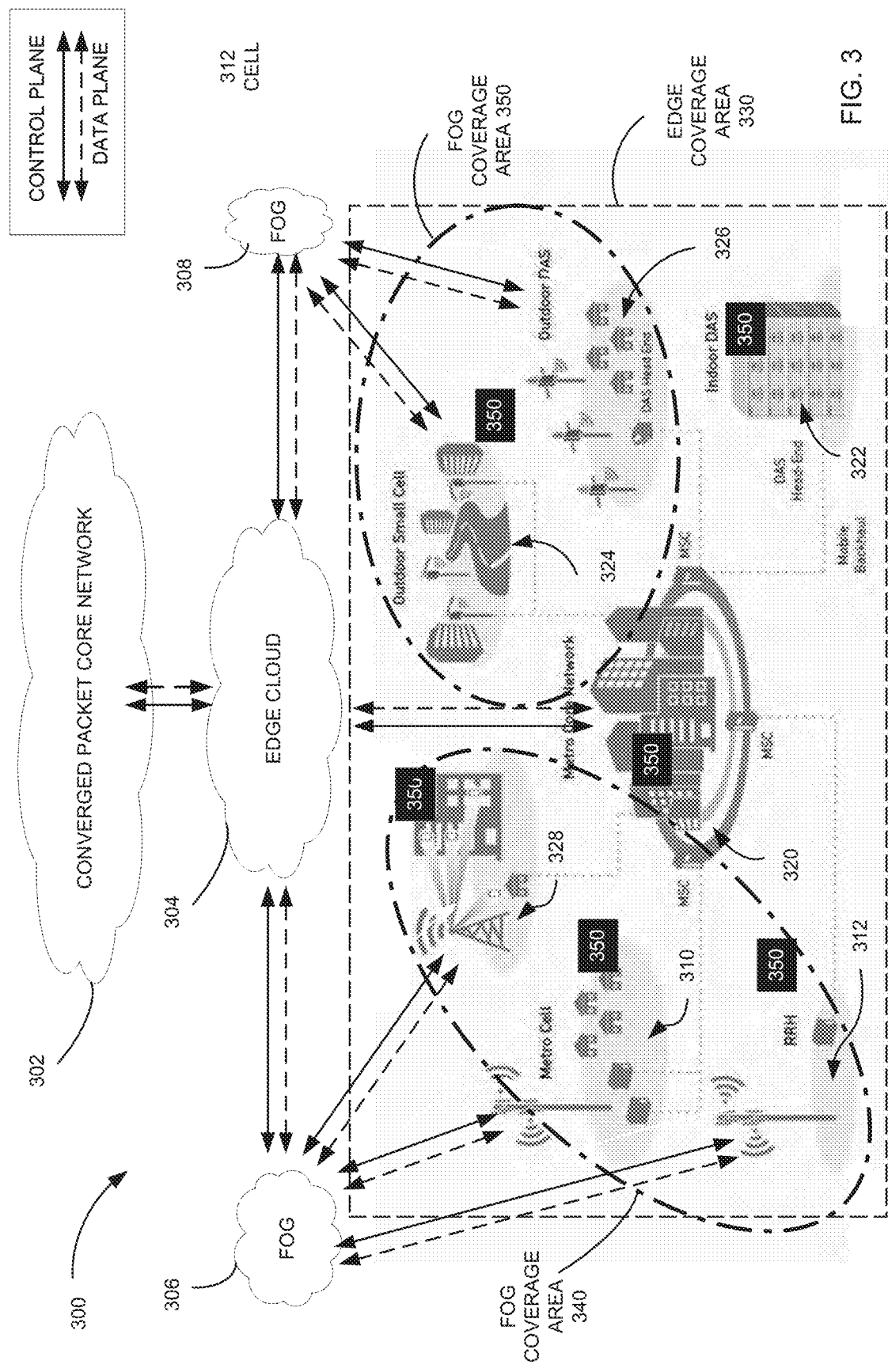
FIG. 3 is an example of directed wireless infrastructure configured to support a wireless network, including repeaters, reflectarrays and so forth.

The cloud network model is also partitioned into various distributed components, such as the edge cloud 304 of FIG. 3 in communication with a converged packet network 302. Smaller cloud structures, such as fog 306, 308 are also used to bring speed and computations closer to the end users. Edge cloud 304 has coverage area 330 including fog coverage areas 340, 350 associated with fogs 306, 208, respectively, there are a variety of buildings 350 within edge coverage area 330 having NLOS areas such as 322. Infrastructure elements are positioned to reach these areas of poor to no signal quality.

Figure 4:
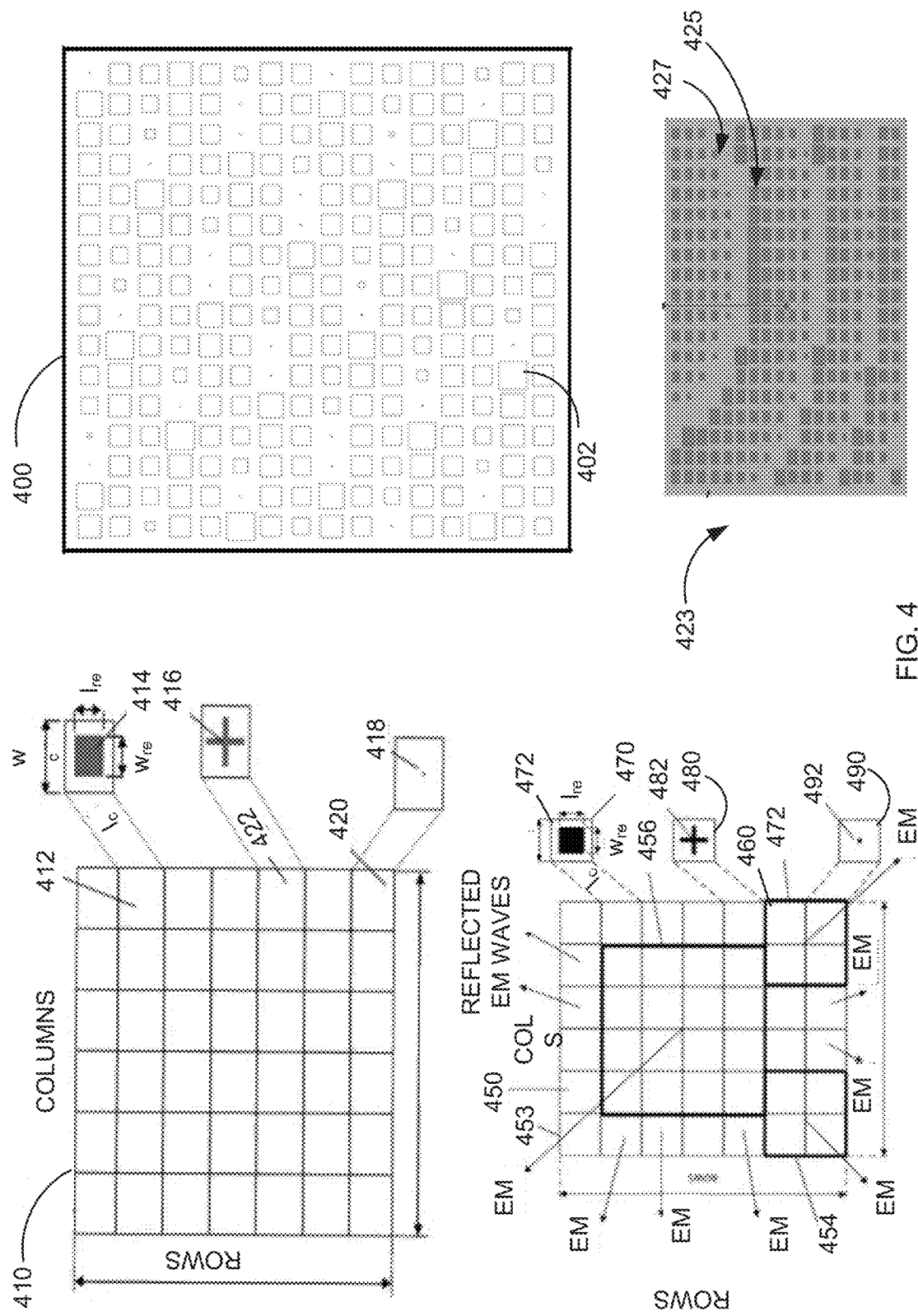
FIG. 4 is a diagram of meta-structure (MTS) reflectarrays, in accordance with various examples of the present inventions.

Infrastructure elements include passive reflect arrays, such as the passive reflectarrays of FIG. 4. Reflectarray (RA) 400 is a passive device configured to redirect signals in a frequency range from a transmitter into a new direction. Each cell in the reflectarray 600 may have a different reflector element 402, where the size and placement of each reflector element is designed to achieve a relationship between an incident wave having an angle of arrival and a passive reflection direction. The elements of RA 400 in the present example or MTS elements which are designed to achieve a specific behavior. The elements of RA 400 may have a variety of sizes, shapes, and configurations. In some embodiments, the thickness of each element may be varied to achieve specific results.

Attention is now directed to the other RAs in FIG. 4, which shows a schematic diagram of a MTS reflectarray and its cell configuration in accordance to various examples. Reflectarray 410 is an array of cells organized in rows and columns. The reflectarray 410 may be passive or active. A passive reflectarray does not require electronics or other controls, as once in position it directs incident beams into a specific direction or directions. To change the direction(s) may require repositioning the entire reflectarray, which can be achieved by means of mechanical or electronically controlled rotating mounts on the back of the reflectarray 410. The reflectarray 410 provides directivity and high bandwidth and gain due to the size and configuration of its individual cells and the individual reflector elements within those cells.

In various examples, the cells in the reflectarray 410 are MTS cells with MTS reflector elements. In other examples, the reflectarray cells may be composed of microstrips, gaps, patches, and so forth. Various configurations, shapes, and dimensions may be used to implement specific designs and meet specific constraints. As illustrated, reflectarray 410 may be a rectangular reflectarray with a length l and a width w. Other shapes (e.g., trapezoid, hexagon, etc.) may also be designed to satisfy design criteria for a given 5G application, such as the location of the reflectarray relative to a wireless radio, the desired gain and directivity performance, and so on. Each cell in the reflectarray 410 has a reflector element. The reflector elements may also have different configurations, such as a square reflector element, a rectangular reflector element, a dipole reflector element, a miniature reflector element, and so on.

For example, cell 412 is a rectangular cell of dimensions $w_c$ and $l_c$ for its width and length, respectively. Within cell 412 is a MTS reflector element 414 of dimensions $w_{re}$ and $l_{re}$. As a MTS reflector element, its dimensions are in the sub-wavelength range (~$\lambda$/3), with $\lambda$ indicating the wavelength of its incident or reflected RF signals. In other examples, cell 422 has a dipole element 416 and cell 420 has a miniature reflector element 418, which is effectively a very small dot in an etched or pattern printed circuit board ("PCB") metal layer that may be imperceptible to the human eye. As described in more detail below, the design of the reflectarray 410 is made according to geometrical and link budget considerations for a given application or deployment, whether indoors or outdoors. The dimensions, shape and cell configuration of the reflectarray 410 will therefore depend on the particular application. Each cell in the reflectarray 410 may have a different reflector element shapes, sizes and so forth.

Continuing with FIG. 4, an example RA 450, in some applications, it may be desirable for some of the generated RF beams to be stronger in power (e.g., higher in EIRP) than the other generated RF beams. For these applications, MTS reflector elements may be grouped together to generate higher power beams than a single reflector element can generate alone. FIG. 4 illustrates an MTS RA 450 having subsets or groupings of reflector elements generating RF beams. In particular, MTS reflectarray 450 has subsets 454, 456, 460, each including multiple MTS reflector elements and each radiates a respective RF beam (i.e. a respective reflected EM wave), in accordance to various examples. The reflectarray 450 is structured similarly to the MTS reflectarray 410, wherein cells or elements are rectangular in shape and the configuration of cells comprises a matrix. In addition, each MTS cell 453 comprises a respective reflector element and may include a variety of reflector shapes and sizes, similar to the examples illustrated in RA 410. MTS cell 470 includes a patch reflector, cell 480 includes a dipole type reflector 482, and cell 490 includes a micro-sized reflector 492. These are provided as examples and alternate shapes, sizes, and structures may be used. Similarly, the matrix formats of the MTS RAs 410, 450 are also illustrated for clarity of understanding and may have other arrangements, including asymmetric and so forth.

In the example of FIG. 4, groupings 454, 460 have four cells, and grouping 456 has 16 cells. The reflector elements of the cells contained within each of the illustrated groupings radiate a respective RF beam. In addition, the reflector elements that are not contained within the groupings each radiate a respective RF beam per reflector element, such as element 453. Each of the generated RF beams radiate in a different direction from one another. It should be noted that since the groupings having more cells are likely designed to generate higher power RF beams compared to some of the other RF beams.

The reflector elements contained within the various groupings of the MTS reflectarray 450 are designed to have a respective reflection phase to achieve the different directions for the RF beams. For example, the reflector elements of grouping 456 have respective reflection phases such that those reflection elements radiate in unison together to form a single RF beam (i.e. radiate together to form a sum pattern beam). Additionally, it should be noted that the reflector elements that are not contained within any of the groupings are designed to have a respective reflection phase.

During operation of the MTS reflectarray 450, a source transmits a RF signal towards the MTS reflectarray 450. The reflector elements (e.g., MTS reflector element 472, dipole element 482, and/or miniature reflector element 492) receive and reflect the RF signal to generate a plurality of RF beams (i.e. reflected EM wave) that are each directed in a different direction from one another. The phase distribution across the aperture of the MTS reflectarray 450 is such that each of the generated RF beams is radiated in a different direction from one another, which allows for an increase in the coverage area of the RF signal.

The RAs of FIG. 4 are passive devices, once designed they do not require a power source, but rather, are designed for a specific reflection direction(s). They do not include amplifiers to increase the gain and thus reshape the beamform and do not include phase shifters or other mechanisms to redirect the beam. Other infrastructure elements are active, such as the active analog repeater of FIG. 5. The relay system 500 is coupled to the microcontroller, MCU 550, which in this embodiment has a testing unit 552, such as a type specified by Joint Test Action Group (JTAG) as an on-chip or on-board testing module for after manufacturing, e.g. in-situ testing. Each side of relay 500 includes receive and transmit circuitry, beamformers and controls.

As discussed herein, a hybrid reflectarray may be designed that adds control to the passive analog reflectarray to form an active reflectarray having a configuration of reflection elements arranged on the surface of a substrate. In this design, reflection elements may take a variety of shapes, sizes and forms and may be positioned in an irregular manner. An example is RA 423, which may act alone as a passive RA or to which control may be added to adjust the direction of reflection. RA 423 has reflection elements, such as element 425, positioned in a non-linear configuration in one or more dimensions. An RA may be configured with reflection elements arranged in a matrix, while some of the element locations contain no reflection element, such as area 427 of RA 425. The shape and size of reflection elements as well as the overall configuration is a function of the given frequency range, the reflection behavior, the materials used to form the RA, the operational environment and so forth. Note, in these embodiments, the RA does not process data, such as the payload, of any transmissions, but rather is an analog device or structure that is intended to redirect and/or amplify signals; however, the data processing and other edge computing devices may be coupled with the reflectarray to reduce cost and add coverage to a wireless network. The overall size and shape of a reflectarray may take any of a variety of forms in multiple dimensions.

For downlink communications from the gNB, signals are received at antenna unit 504 coupled to beamformer 502. Signals received at antenna unit 504 are then transmitted to the UE though antenna unit 530. For transmit to the UE, an antenna portion 530 is coupled to beamformer unit 510, which is also coupled to MCU 550. Gain and amplification are provided via gain blocks (VGAs) 506, VGAs 508.

Uplink communications from the UE, an antenna unit 540 receives the signals from the UE. The antenna unit 540 is coupled to a beamformer unit 520, which is coupled to MCU 550. The received signals then are controlled by gain block 518 and VGAs 516 after which beamformer 512 provides signals to antenna unit 514 for transmission to gNB.

The antenna units are arrays of radiating elements 516 organized in 8×8 arrays. They are coupled to the beamformers which provide control of the different radiating element to direct and size the relay signal.

The relay system 500 is a high gain active analog relay antenna system, or simply relay or repeater herein for description purposes, is a robust and low cost relay solution that is positioned as illustrated between a radio transmitter and an end user to optimize network coverage. Relay 500 may be a fixed or mobile relay positioned in different elements across a network environment, including, for example, buildings, vehicles, lifters, remote areas, underground, off-shore on the sea, airliners, and so on. In various examples, relay 500 may be used for wireless communications in the downlink, also referred to as forward link, and the uplink, also referred to as return link. In either scenario, relay system 500 increases gain to compensate for propagation losses that occur in the environment. Such losses may be as high as 120-130 dB in a 28 GHz 5G network. Note that because the backhaul link in a 5G system includes the capability for point-to-point links, relay 500 may be implemented with high gain array antennas.

Obstructing objects and structures may include traffic and roadway infrastructure, high rise building, bridges, tunnels, vegetation, and so forth. The gNB, relay and are positioned in a large turning angle to provide wireless coverage to NLOS areas at a high gain and therefore achieve the desired performance and wireless experience to users. In various examples, relay 500 includes two pairs of antennas, one pair for the down link, and the other pair for the uplink. The active analog relay system boosts a weak signal plagued by propagation loss from the receive antenna to a specific gain level to drive the transmit antenna. Relay 500 also includes support mounts to serve as support members of the relay 500 antennas and active relays.

Figure 5:
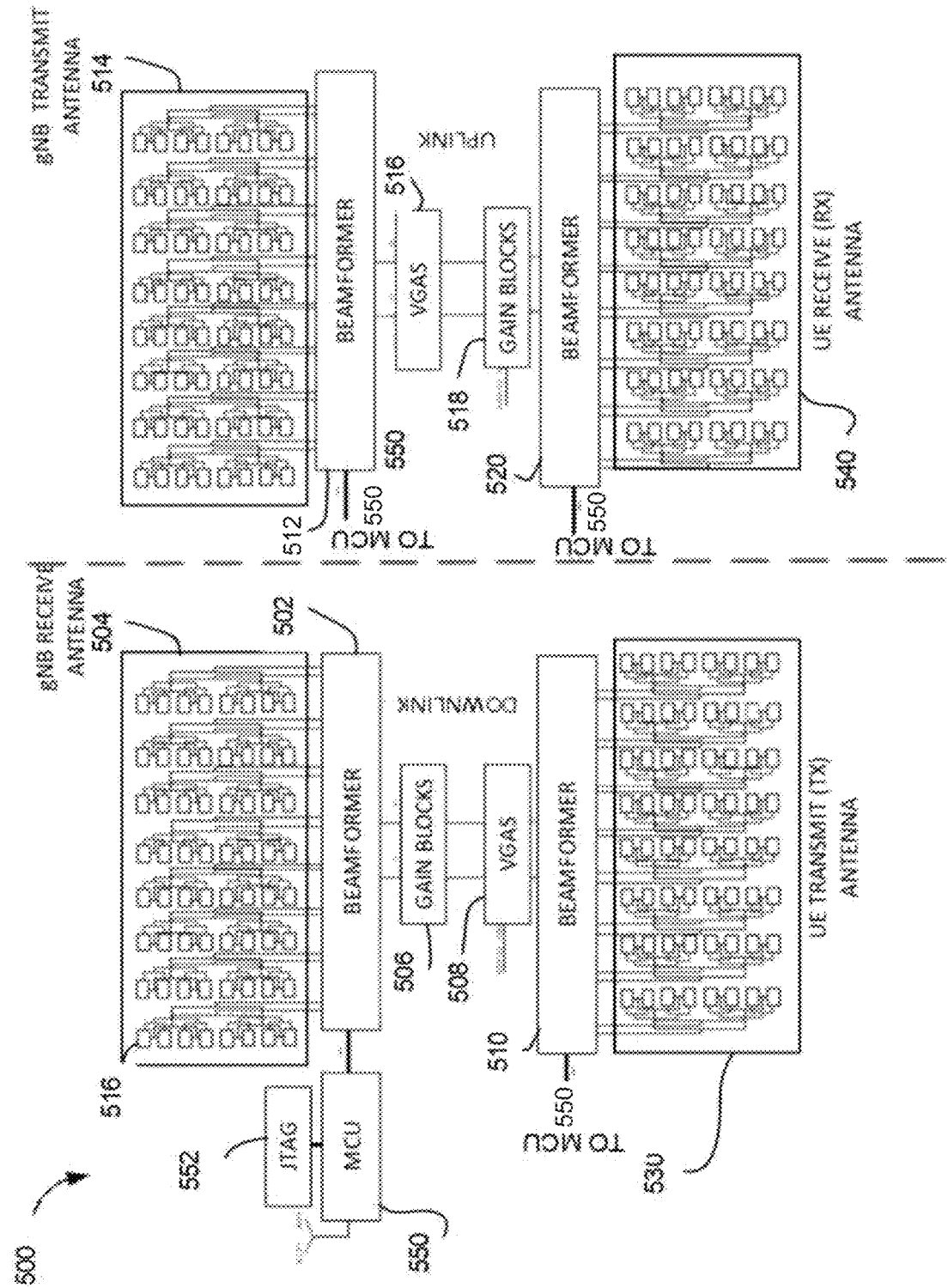
FIG. 5 is a diagram of an active analog repeater, in accordance with various examples of the present inventions.

Continuing with FIG. 5, each antenna module is similar, but other embodiments may implement alternate shapes and configurations. In relay 500, the downlink receive antenna 504 includes 8 columns of elements, wherein each column is from one or more transmission lines, divided out to the various elements 516. The elements in some embodiments are patch antenna elements, and in other embodiments are meta-structures, wherein the elements 516 are designed to enable beam steering and beam forming. Each of the columns is so arranged and coupled to beamformer unit 502 having a feed network to distribute the signal along the propagation path. The antenna module 504 array is arranged in rows of elements 516 which are not coupled together. The array of antenna module 504 is controlled to form a beam with direction and shape. The other antenna modules are similarly configured. As illustrated, the elements 516 have a uniform shape and are linearly arranged. Alternate embodiments may employ different sizes or shapes of elements as a function of operation parameters and requirements, materials of construction, microcontroller capabilities and so forth. In some embodiments, the elements are not uniformly spaced or arranged, but each element, also referred to as a cell, may be individually designed such that the array or portions of the array operate together to form a beam.

It is appreciated that the proposed architecture of relay 500 with two antenna pairs and one active relay in between the receive and transmit antennas in each antenna pair is particularly suitable for millimeter wave relay applications where the backhaul link is typically a point-to-point link and the access link is a point-to-multipoint link. Further, the architecture of relay 500 allows a separation of access and infrastructure antennas so that they are optimized in an independent way without any constraint from each other, i.e., the access link antennas can be designed for a wide, and/or shaped coverage to provide optimized connectivity with the UEs, while the infrastructure antennas can be implemented with high directivity designs with narrow beams to compensate for the high path loss in the millimeter wave band, alleviating the interference of other cells. The infrastructure antennas can be optimally pointed to the units within the system, and the access link antennas can point to the coverage area of end users at the best orientation angle.

Note that for an access link antenna, its gain is reduced when it is designed to cover a wide area with a wide beam. In such circumstances, the coverage area will not be large with the limited beamforming gain for these types of access link antennas. The access link antennas can be designed to form shaped beams, i.e., beams with specific shapes to cover an area in which most of the subareas are covered and some of the areas can be masked without radio signals reached. This is a unique feature with the proposed two-antenna architecture for relay systems of the present invention. Note also that an active solution becomes necessary and often indispensable in millimeter wave wireless applications. The power amplification functionality provided by active relays described herein enables a power gain from some tens of dB up to over hundreds of dB to boost the relayed signal in both downlink and uplink, meeting the connectivity requirements in the access links.

The antennas in relay device 500 are array antennas and may be designed for the specific application, environment (e.g., whether in a city, remote area, etc.) and associated conditions (e.g., weather, population, etc.). In various examples, the radiating elements are based-on meta-structures, which are specially designed structures that manipulate electromagnetic signals to suit various applications. Each antenna can be made 3D maneuverable in roll, pitch and yaw using a suitable mechanical structure, as illustrated 6. Note that the yaw rotation adjusts the antenna in azimuth, the pitch rotation corresponds to elevation, and the roll rotation can be used to adapt to a specific linear polarization. The maneuverable design allows backhaul antennas to be pointed to gNB antennas and access link antennas to cover areas in different shapes and ranges with wide beams, also avoiding interferences. Compared to metallic parabolic antennas, phased array antennas are lighter and without separate feed structures for better aerodynamics. The feed network for the antenna portions of relay device 500 antenna are embedded in a phased array structure on a PCB substrate.

In some example implementations of an active analog relay system includes wideband stages without passband filtering for use with Frequency Selective Surface ("FSS") arrays. The stages in active relay may include a Low-Noise Amplifier ("LNA") stages with gain regulation, and an amplifier stage. The amplifier stage is able to generate an adjustable power gain to boost wireless signals in a 5G wireless network and improve overall coverage and network performance to the network users. The repeater 500 may be implemented as a stand-alone device or may be integrated or combined with other devices, such as a reflectarray device.

Figure 6:
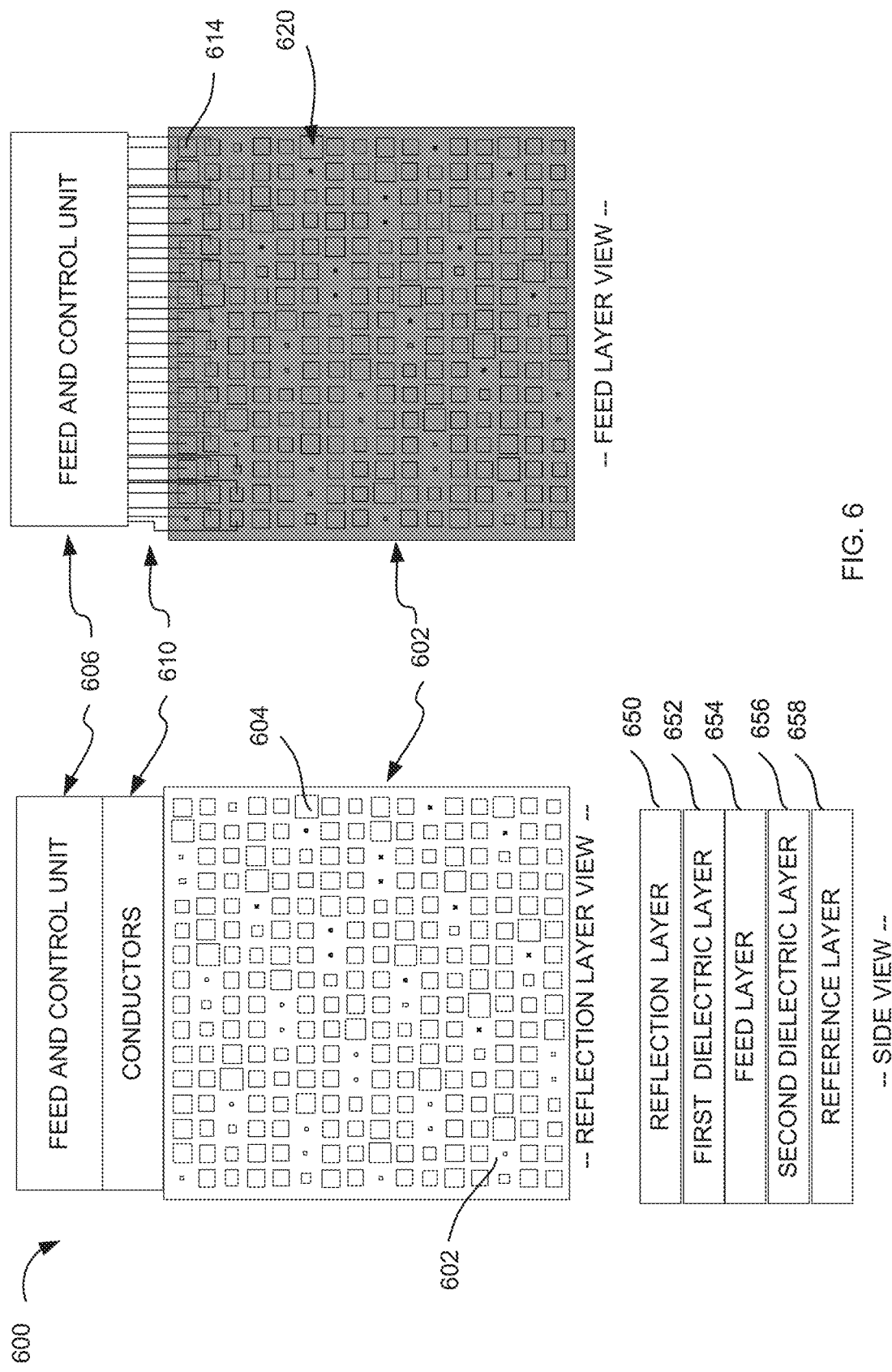
FIG. 6 illustrates an active reflectarray, in accordance with various examples of the present inventions.

FIG. 6 illustrates another infrastructure element applicable for high frequency and directed wireless transmission systems. In some embodiments of the present inventions, an active reflectarray 600 has a configuration of reflection elements 604 arranged around the surface of a substrate, wherein reflection elements 604 may take a variety of shapes, sizes and forms and may be positioned in an irregular manner. For example, RA 600 has reflection element 604 and others and has areas having no reflection elements, referred to herein as open areas. The reflection elements and open areas are illustrated in a matrix graph format. Alternate embodiments arrange reflection elements and open areas in non-linear configurations in one or more dimensions, such as illustrated in RA 423 of FIG. 4. As discussed hereinabove, an RA may be configured with reflection elements arranged in a matrix, while some of the element locations contain no reflection element, open areas. The shape and size of reflection elements as well as the overall configuration is a function of the given frequency range, the reflection behavior, the materials used to form the RA, the operational environment and so forth. Note, the RA does not process data, such as the payload, of any transmissions, but rather is an analog device or structure that is intended to redirect and/or amplify signals.

In some embodiments of the present inventions, the passive analog reflectarray is modified to include additional directional control provided by a control unit. In FIG. 6 the reflectarray 600 is coupled to a feed network and control unit 606 by way of multiple conductors 610 attached to the unit 612. Conductors 610 may include a conductor to each reflection element 602 or may include a subset of conductors to select reflection elements. FIG. 6 several conductors 610 for detailed for illustration, however, this is continued for all elements on the RA 600 in this example. The conductors 610 enable control of energy to the connected reflection elements.

The feed layer view illustrates the locations of reflection elements of the reflection layer. For example, the location 620 on the feed layer corresponds to the location of the reflection element 604 on the reflection layer 604; it is at this position that a connection is made for a conductor to the feed and control unit 606. The feed and control unit 606 provides energy to the reflection elements to control redirection of the reflectarray 600 and/or addition of gain to the reflection signals.

In a complete structure, the conductors 610 are formed in a layer of the stack, such as illustrated in the side view of RA structure 602 In some examples, the reflection elements are positioned on a top reflection layer 650 under which is a feed layer 654 on which the conductors 610 are configured. A first dielectric layer 652 is sandwiched between the reflection layer 650 and the feed layer 654. Similarly, a second dielectric layer 656 is positioned on the opposite side of the feed layer 654, and then a reference layer 658 is positioned on the other side of the second dielectric layer 656.

Figure 7:
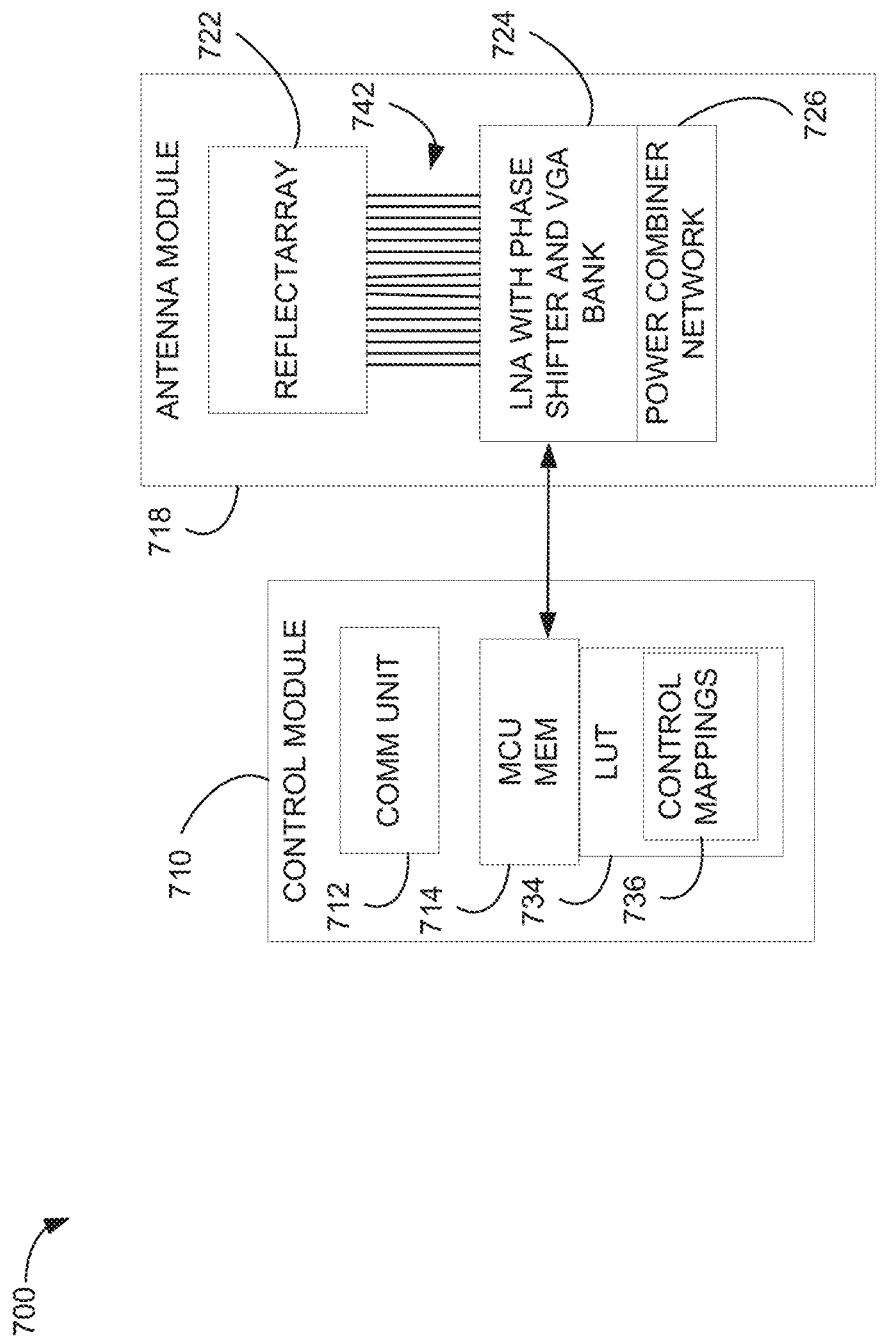
FIG. 7 illustrates in block diagram form, an active reflectarray, in accordance with various examples of the present inventions.

An example active reflectarray is further detailed in FIG. 7 as system 700 having an array 722 which is a reflectarray composed of multiple reflection elements, such as in FIG. 6. The reflectarray 722 is coupled to control modules 724, 726, by way of conductors 742, which are controlled by control module 710 according to the desired behavior of the reflectarray 722. The control module 710 has a communication module 712 enabling communication from a wired connection or a wireless connection, such as a 5G signal or a messaging with an IoT device and so forth. A microcontroller memory 714 and Look Up Table (LUT) 734 store information used in control of the reflectarray 722. The LUT 734 includes a control mappings to direction of reflection. The control module 724 includes amplifiers and phase shifters. These are used to provide energy to the reflection elements and thus control changes in direction of reflection, which is typically not part of a pure passive reflectarray. In at least one direction of reflection, the reflectarray 722 acts in a passive way to reflect signals without any active control.

Figure 8:
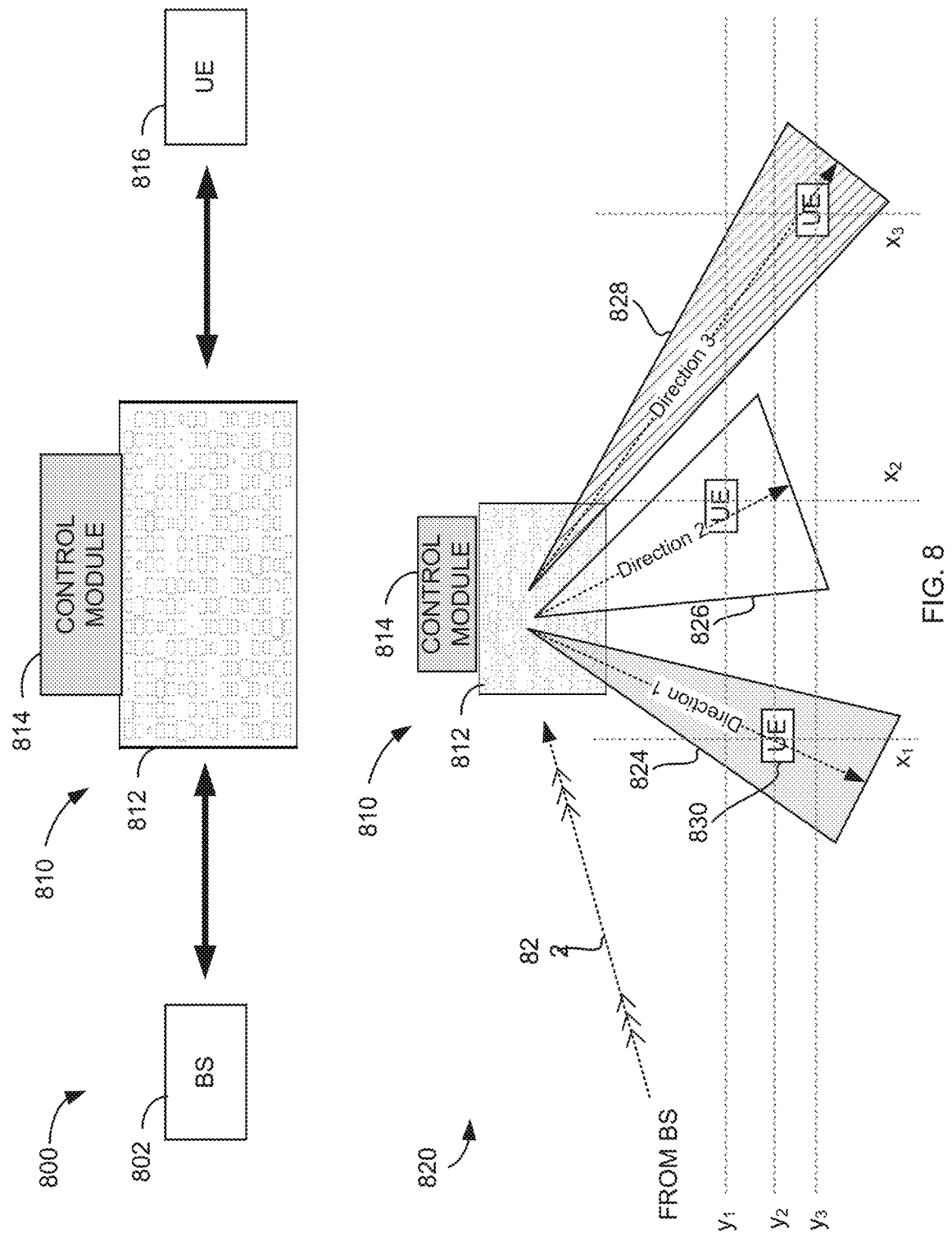
FIG. 8 illustrates an active reflectarray in a wireless environment and operation thereof, in accordance with various examples of the present invention.

FIG. 8 illustrates a scenario for an active reflectarray 810 in an environment 800, having a high frequency BS 802 communicating with an end user (UE) 816. The active reflectarray 810 includes a reflectarray 812 and a control module 814. In operation, scenario 820 describes control of the direction of reflection in three directions. The signals 822 are received from a BS and for a first control setting, the direction of reflection is to cover an area including point ($x_1$, $y_2$) for communication with a UE 830. This may be a first configuration for the reflectarray 810 in a first location and controlled to cover a first coverage area. At some point, the desired coverage area may change prompting a change in the direction of reflection. This may be on changes in configuration of an office or it may be changes in user communication traffic at specific times of day, such as in a mall at lunch time. In some situations, the control module 814 is adapted to find a best coverage area for a UE as it moves.

The reflection beam 824 includes this location. The control module 814 is adapted to effect changes for a second coverage area 826 for movement of the UE 830. The second coverage area 826, also referred to as second direction beam 826, includes the area around the position of the UE 830 at this point in time and at location ($x_2$, $y_1$) and surrounding area. The beam 826 has a different shape from that of beam 824 as closer to the reflectarray 812 and covering a wider area. A third example has the beam direction changed to beam 828 where the UE 830 is positioned at ($x_3$, $y_3$). The beam 828 is shaped and directed to accommodate the movement of the UE.

Figure 9:
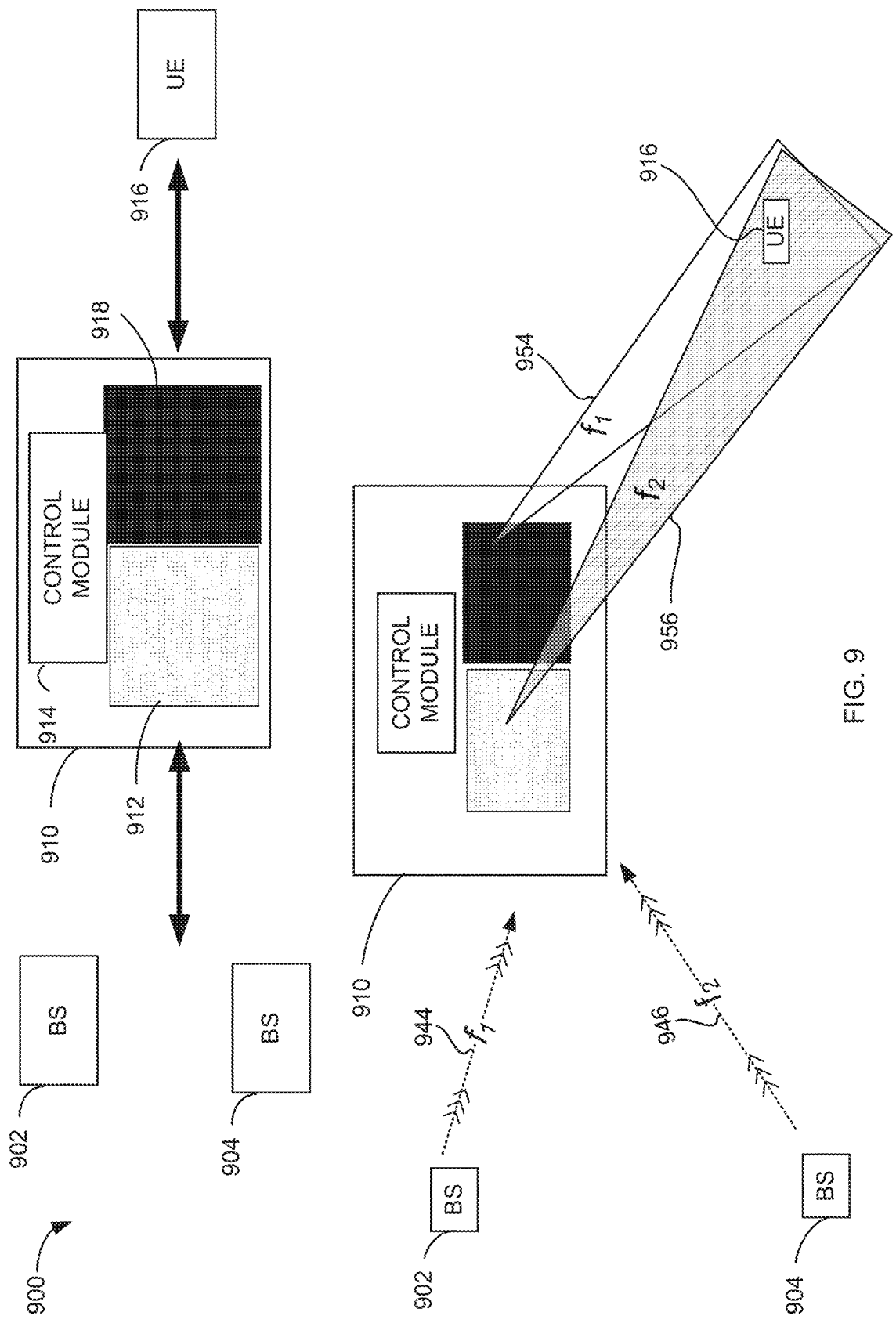
FIG. 9 illustrates a hybrid module having a reflectarray and a repeater in a wireless environment and operation thereof, in accordance with various examples of the present invention.

An example of a hybrid reflectarray is illustrated in FIG. 9 in environment 900. The hybrid system 910 includes a reflectarray 912 and an active repeater 918. A control module 914 is adapted to control operation of the active repeater 918 in a first embodiment, and to control both the active repeater 918 and the reflectarray 912 in a second embodiment. Various combinations are considered and may be implemented using control modules. The reflectarray 912 may be used in collaboration with the active repeater 918 or they may cover different areas or respond to different transmitters. In this scenario, BS 902 and BS 904 are communication with at least one UE 916. In this situation, BS 902 operates at a first frequency, $f_1$, and BS 904 at a second frequency, $f_2$. BS 902 signals are reflected from reflectarray 912, while signals from BS 904 are redirected and amplified by repeater 918. In this way, the UE 916 may receive communications at different frequencies.

Figure 10:
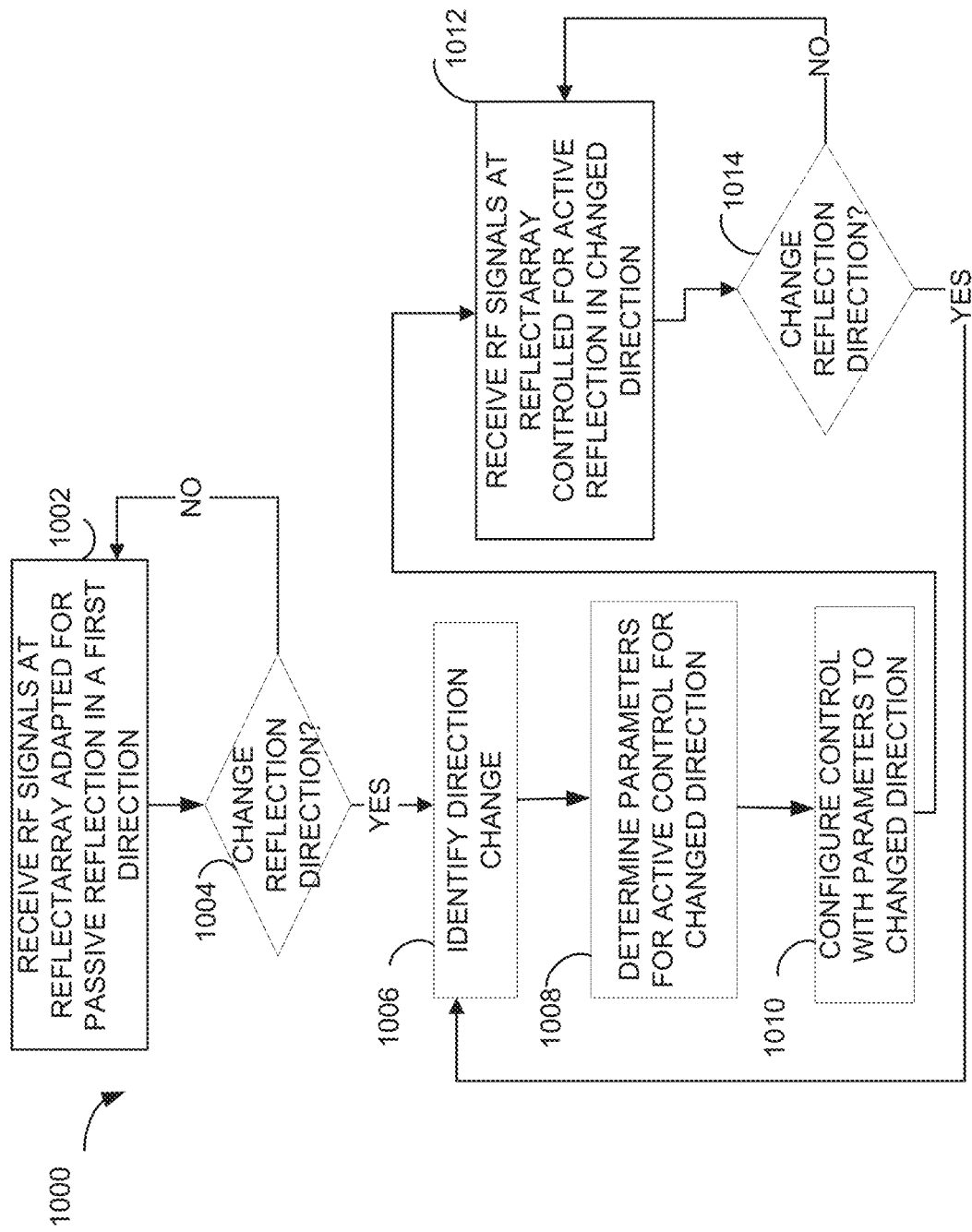
FIG. 10 illustrates a process for operation of an active reflectarray, in accordance with various examples of the present invention.

FIG. 10 illustrates operation of an active reflectarray. Process 1000 begins as RF signals are received at an active reflectarray that is also adapted for passive reflection in a first direction, 1002. When a change in reflection direction is indicated, 1004, processing continues to identify the direction change, 1006, else passive reflections continue. Parameters for the active control to achieve the changed direction may be received by communication or adjusted based on stored mappings of control to direction, 1008. The control configuration is changed to implement the parameters, 1010. As the reflection direction is now changed, signals received at the reflectarray are reflected to the new direction, 1012. When a change in direction is prompted, 1014, processing returns to identify the direction change 1006, else operation continues at these control parameters.

The present inventions describe infrastructure elements including meta-structure ("MTS") based reflectarray for deployment for 5G applications according to various examples. Wireless transmissions of wireless signals between BSs and mobile devices within coverage areas may be disrupted by buildings or other structures in the environment, which may affect the quality of the wireless signals. The disruption of a Line-of-Sight ("LOS") zone or the positions of UEs outside this zone impact wireless access and significantly reduce coverage. With the high frequency bands used for 5G, it is difficult to expand the coverage area outside the LOS zone of a BS, and it is expected that the wireless industry will utilize the reflection of radio waves as a solution.

Wireless coverage can be significantly improved to users outside of the LOS zone by the installation of a MTS based reflectarray on a surface of building as a robust and low-cost relay to significantly improve network coverage. A reflectarray is formed, placed, configured, embedded, or otherwise connected to a portion of building, where there may be one or multiple such reflectarrays placed in external and/or internal surfaces of building as desired.

In various examples, reflectarray acts as a relay between a BS and users within or outside of its LOS zone. Users in a Non-Line-of-Sight ("NLOS") zone are able to receive wireless signals from the BS that are reflected off the reflectarray. Various configurations, shapes, and dimensions may be used to implement specific designs and meet specific constraints. The reflectarray can be designed to directly reflect the wireless signals from a BS in specific directions from any desired location in the illustrated environment, be it in a suburban quiet area or a high traffic, high density city block. Use of a reflectarray as described herein can result in a significant performance improvement of even ten (10) times current 5G data rates. This is critical in high traffic areas, city environments, and other areas that require additional coverage. The reflectarrays may be used in an office or inside location, such as a mall.

Passive reflectarrays are designed for specific locations and are placed according to NLOS areas and geometries as well as usage patterns for UEs. The design of the reflectarray and the determination of the directions it needs to reach for wireless coverage and performance improvements take into account the geometrical configurations of the environment, including placement of radio transmitters and the distance relative to reflectarray, as well as link budget calculations.

Note that MTS reflectarrays can be placed in both outdoor and indoor environments where signal quality and coverage are issues, such as areas of high traffic congestion or where downloads are expected at a given speed. Indoor wireless configurations often position radio transmitters in corners to provide the broadest coverage; the extension devices described herein are critical in reaching NLOS areas and so forth. A fixed wireless network may be configured in an office setting, where the extension devices are stationary. There may be any number of UEs in an indoor area at any given time; there may be a high speed data communications required for these UEs. The placement of extension devices are planned for pre-determined locations to enable RF waves from a radio transmitter to reach the potential locations of the UEs. Additionally, an office set up may change as desks, partitions and devices are reorganized. Any change in the operation or prior art devices, such as reflection direction or amplification, may require re-positioning by a manual process. The present inventions are significant improvements over these configurations as the active reflectarray and hybrid reflectarray-repeater systems may be positioned in fixed locations and controlled remotely to change operational parameters and behavior, such as reflection direction. The extension devices are to reach in a range of directions and improve performance. The performance boost achieved by the devices described herein are achieved by constructive effect of the directed beam incident and reflected from the array cells and the reflector elements contained therein. This constructive effect is achieved with a passive (or active), low cost and easy to manufacture reflectarray that is crucial for enabling 5G applications. In addition to many configurations, the reflectarrays disclosed herein are able to generate narrow or broad beams as desired, e.g., narrow in azimuth and broad in elevation, at different frequencies (e.g., single, dual, multi-band or broadband), with different materials, and so forth. The reflectarrays can reach a wide range of directions and locations in any 5G environment. These reflectarrays are low cost, easy to manufacture and set up, and may be self-calibrated without requiring manual adjustment to its operation. The reflectarrays and other devices may be posted on a structure near a highway to provide improved wireless coverage and 5G performance in communications with vehicles and communication devices therein.

Some applications implement a reflectarray that is a flat rectangular (or other shape) panel mounted to the post or a bendable reflectarray that can curve around the post. The reflectarray is a configuration of cells which may be organized in a variety of ways, such as honeycomb, matrix and so forth. Design of the arrangement or configuration may be random, as each cell and each configuration is determined according to the specific requirements of a given reflectarray for a given scenario. In passive operation, the reflectarray does not require electronics or other controls, as once in position it directs incident beams into a specific direction or directions. The reflectarray provides directivity and high bandwidth and gain due to the size and configuration of its individual cells and the individual reflector elements within those cells.

In various examples, the cells in the reflectarray are MTS cells with MTS reflector elements. In other examples, the reflectarray cells may be composed of microstrips, gaps, patches, and so forth. Various configurations, shapes, and dimensions may be used to implement specific designs and meet specific constraints. As illustrated, reflectarray may be a rectangular reflectarray with a length l and a width w. Other shapes (e.g., trapezoid, hexagon, etc.) may also be designed to satisfy design criteria for a given 5G application, such as the location of the reflectarray relative to a wireless radio, the desired gain and directivity performance, and so on. Each cell in the reflectarray has a reflector element. The reflector elements may also have different configurations, such as a square reflector element, a rectangular reflector element, a dipole reflector element, a miniature reflector element, and so on.

In various examples, the cells in the reflectarray are MTS cells with MTS reflector elements. In other examples, the reflectarray cells may be composed of microstrips, gaps, patches, and so forth. Various configurations, shapes, and dimensions may be used to implement specific designs and meet specific constraints. The rectangular reflectarray with a length l and a width w. Other shapes (e.g., trapezoid, hexagon, etc.) may also be designed to satisfy design criteria for a given 5G application, such as the location of the reflectarray relative to a wireless radio, the desired gain and directivity performance, and so on. Each cell in the reflectarray has a reflector element. The reflector elements may also have different configurations, such as a square reflector element, a rectangular reflector element, a dipole reflector element, a miniature reflector element, and so on.

For example, consider cell 412 of FIG. 4, which is a rectangular cell of dimensions $w_c$ and $l_c$ for its width and length, respectively. Within cell 412 is a MTS reflector element 414 of dimensions $w_{re}$ and $l_{re}$. As a MTS reflector element, its dimensions are in the sub-wavelength range ($\sim\lambda/3$), with $\lambda$ indicating the wavelength of its incident or reflected RF signals. In other examples, cell 422 has a dipole element 416 and cell 420 has a miniature reflector element 418, which is effectively a very small dot in an etched or pattern printed circuit board ("PCB") metal layer that may be imperceptible to the human eye. As described in more detail below, the design of the reflectarray 410 is driven by geometrical and link budget considerations for a given application or deployment, whether indoors or outdoors. The dimensions, shape and cell configuration of the reflectarray 410 will therefore depend on the particular application. Each cell in the reflectarray 410 may have a different reflector element, as illustrated with the reflectarray 423 also illustrated in FIG. 4.

Reflectarrays have high manufacturability as they may be made of low cost PCB materials suitable for high frequency, such as mmwave, operation, having metal ground plane and a patterned metal layer with dielectric sandwiched therebetween. There may be any number of layers depending on application. The reflector elements of the reflectarray may be etched or deposited into a metal material to form the patterned metal layer. In various examples, the metal ground plane and the patterned metal layer are copper layers surrounding a composite dielectric material. Other materials may be used to design the reflectarray, depending on the desired performance of a given 5G application. A back surface may be attached to the ground plane layer of the reflectarray to provide a mounting structure for a wall or other like surface.

Figure 12:
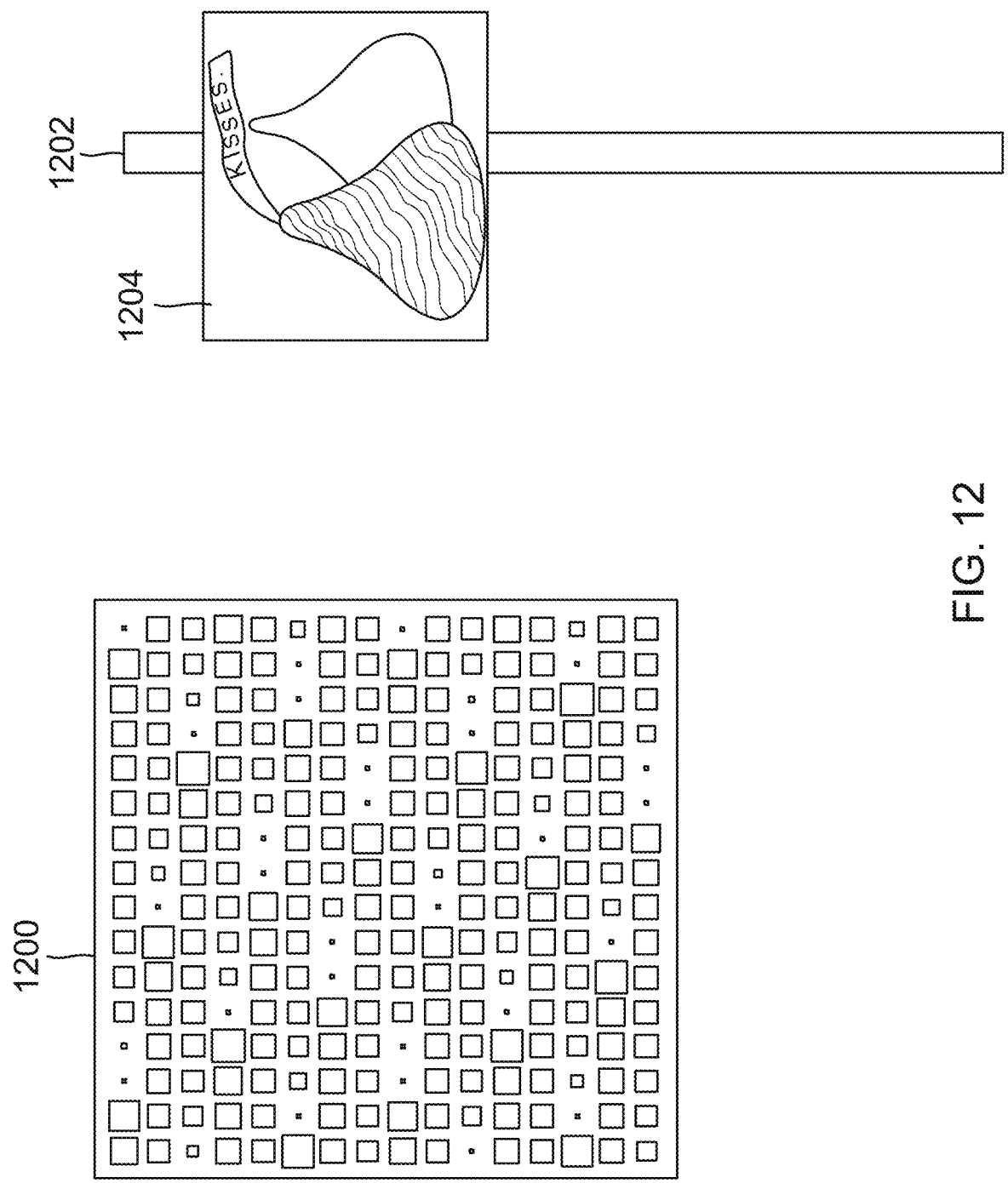
FIG. 12 illustrates a reflectarray in situ.

FIG. 12 illustrates a reflectarray in situ. In various examples, a removable cover may be placed on top of the reflectarray as desired by the application. As in FIG. 12, reflectarray 1200 has a removable cover 1204 mounted on a post 1202, such as a that may be positioned on top of the reflectarray by various means, such as by glue, silk screening, or other such means. Care must be taken during the design process of the reflectarray 1200 to select appropriate cover materials that will not interfere with the directivity performance of the reflected RF signals, e.g., fiberglass or other such materials. In various examples, the reflectarray 1200 may be designed and simulated with the removable cover 1204 to ensure that the reflectarray cells and their reflector elements will provide the desired performance. The removable cover 1204 may serve a dual purpose to protect the reflectarray 1200 from environmental or other damage to its surface and to enable 5G providers, emergency response systems, and others to show messages, advertisements or promotions in the reflectarray 1200 that are viewable by UE within its vicinity. There may be various configurations of cover 1204 that enable ads and messages to be relayed from the reflectarray 1200 mounted to a surface via a back mount.

For the active reflectarray a solar or other energy source may be co-located with the reflectarray.

Figure 11:
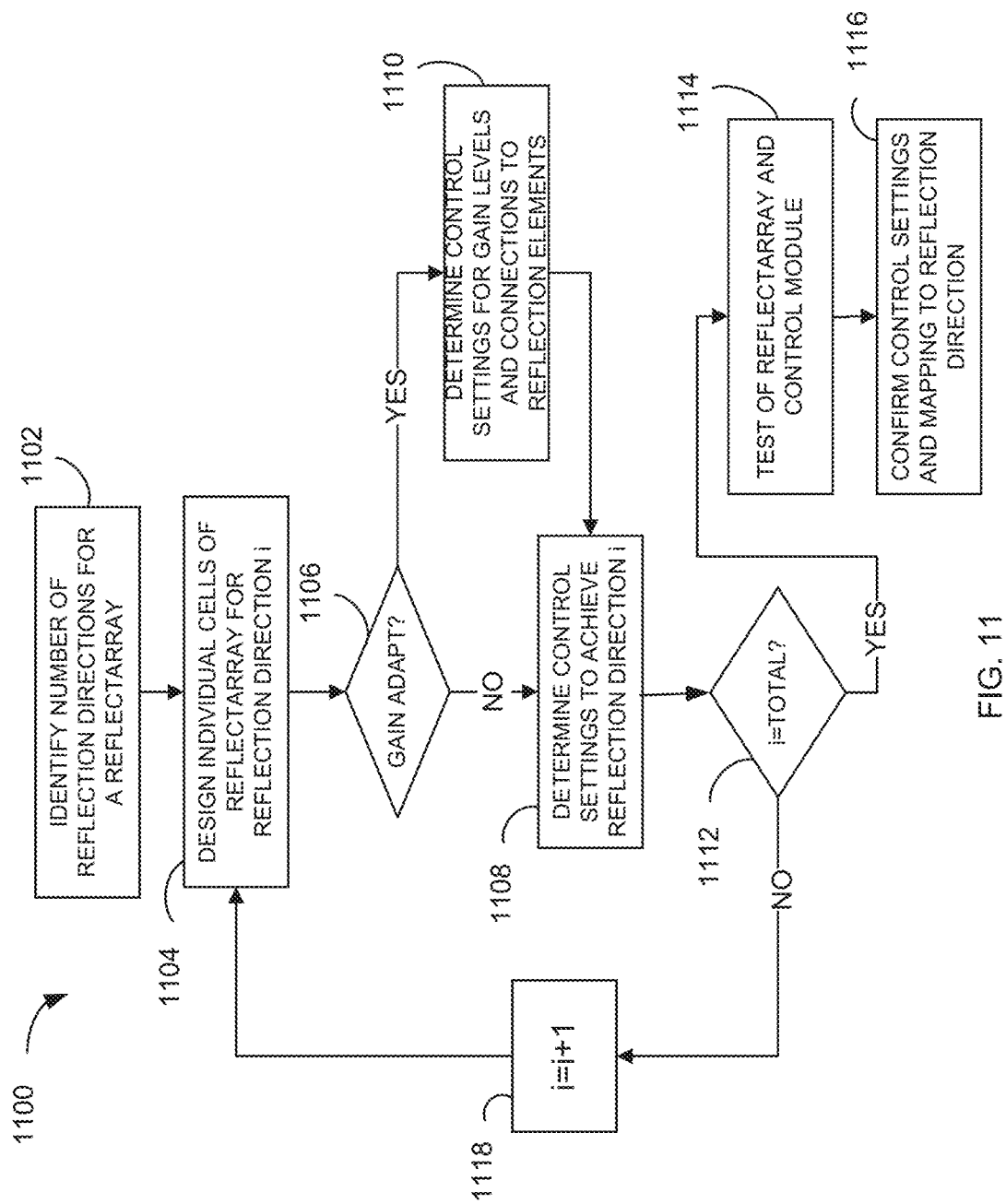
FIG. 11 illustrates a process for design of an active reflectarray, in accordance with various examples of the present invention.

Attention is now directed to FIG. 11, which shows a flowchart for designing an active reflectarray according to the various examples disclosed herein. The first step in the design process 1100 is to identify the number of reflection directions or angles for a reflectarray for a given geometry setup, such as for a desired 5G application, 1102. This involves determining the position of the BS or wireless radio that provides the incident RF signals to be reflected off the reflectarray, including its distance from the reflectarray, and the orientation and position of the reflectarray itself. Once this initial information is determined, the process designs individual cells of reflectarray for a first reflection direction, 1104. Once this is designed, if the reflectarray is to have gain control, processing determines the control settings for gain levels and connections to reflection elements, 1110. The process then determines the control settings to achieve the desired operation for this reflection direction. The process is iterative for the entire reflectarray. Once completed, the reflectarray and control module are tested, 1114 and confirmed, 1116. Note that designing the individual cells of the reflection direction, 1104, may be done in a variety of way, In some embodiments of the present invention, the process considers the elevation and azimuth angles, the distances involved, and other geometries. This information is used to determine a link budget with a gain profile, frequency range, center frequency, bandwidth, effective isotropic radiation power (EIRP), polarization, receive sensitivity, and other parameters and measures or calculates/synthesizes the far field radiation pattern for each iteration of process 1100.

Once the shape and size of the reflectarray are determined, the the phase distribution on the reflectarray aperture is determined according to the link budget and the reflectarray cells are designed, i.e., their shape, size, and material are selected. The reflection phase, $\varphi_r$, for an $i^{th}$ cell in the reflectarray is calculated, such as in the following:

$$\varphi_r = k_0(d_i - (x_i \cos \varphi_0 + y_i \sin \varphi_0) \sin \theta_0) \pm 2N\pi \quad \text{(Eq. 1)}$$

wherein $k_0$ is the free space propagation constant, $d_i$ is the distance from the BS to the $i^{th}$ cell in the reflectarray, N is an integer for phase wrapping, and $\varphi_0$ and $\theta_0$ are the azimuth and elevation angles for the target reflection point. The calculation identifies a desired or required reflection phase $\varphi_r$ by the $i^{th}$ element on the x-y plane to point a focused beam to $(\varphi_0, \theta_0)$. $d_i$ is the distance from the phase center of the BS to the center of the $i^{th}$ cell, and N is an integer. This formula and equation may further include weights to adapt and adjust specific cells or sets of cells. In some examples, a reflectarray may include multiple subarrays allowing redirection of a received signal in more than one direction, frequency, and so forth.

The design process is intended to achieve the phase distribution on the reflectarray aperture. The design process steps may be iterated as needed to adjust parameters such as by weighting some of the cells, adding a tapering formulation, and so forth. In some embodiments, the design process considers the near field in a similar manner. The ability to redirect the beam of the reflectarray is effective through phased array operation having a control module to supply energy to the reflection elements. The combinations of extension infrastructure elements is flexible to consider the many areas covered by wireless communications.

The present inventions provide methods and apparatus to enhance 5G and mmwave communications. The active reflectarray provides control of the reflectarray within the benefits of a passive array.

Figure 13:
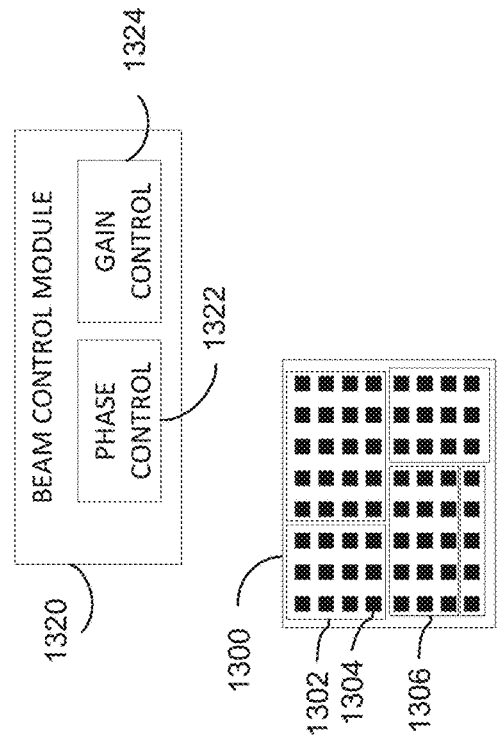
FIG. 13 illustrates an active redirection device, in accordance with various examples of the present invention.

FIG. 13 illustrates an antenna configuration of an array 1300 of radiating elements 1304 having various sized subarrays 1302, 1306 and so forth. A beam control module 1320 is coupled to the array 1300, wherein analog components, phase control 1322 and gain control 1324, are coupled to the radiating elements of subarray 1302 of array 1300. By adjusting the phase control 1322 and gain control 1324, such as by bias voltage or other means, these shift the phase of the radiating elements and the combination of elements 1304 within a subarray, such as subarray 1302. In this way, a redirection device may be controlled remotely to change beam size, dimensions, range, direction and so forth.

Figure 14:
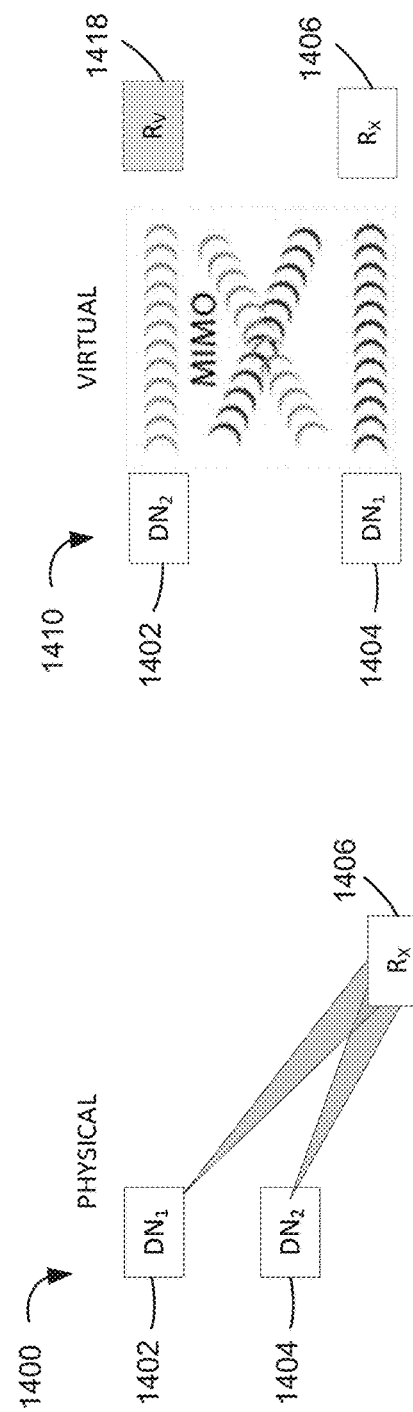
FIG. 14 illustrates an active redirection device in a virtual MIMO system, in accordance with various examples of the present invention.

FIG. 14 illustrates a redirection system 1400 having multiple downlink redirection devices 1402, 1404, transmitting a same signal at different phase shifts. The parameters of the system 1400 are known at a remote device 1406. On receipt of the multiple signals, the remote device 1406 receives the signals from the different transmitters and combines them for improved reception. The system 1400 behaves similar to a virtual MIMO system, where a virtual receiver 1418 is implemented by differentiation of the received signals from the multiple downlink transmitters.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An active redirection system, comprising:
a redirection device of reflective elements having sizes, shapes and configurations configured to generate a first phase distribution across the redirection device, the first phase distribution having a first reflection direction;
a control module coupled to the redirection device and adapted to provide energy to one or more reflective elements to generate a second phase distribution across the redirection device, the second phase distribution having a second reflection direction; and
a plurality of passive redirection devices each having a respective reflection phase, wherein the plurality of passive redirection devices are configured to generate a plurality of RF beams,
wherein the active redirection system is configured for reflecting millimeter wave signals.

2. The active redirection system of claim 1, wherein the redirection device is further configured to operate as a relay between a source and a receiving device to spread the RF signal, thereby increasing a coverage area of the source.

3. The active redirection system of claim 2, wherein the source has a first coverage area, and the redirection device has a second and third coverage area.

4. The active redirection system of claim 3, wherein the redirection device operates as a passive reflectarray for a default reflection direction.

5. The active redirection system of claim 4, further comprising an amplification module.

6. The active redirection system of claim 5, further comprising a plurality of phase shifters.

7. The active redirection system of claim 1, further comprising a plurality of phase shifters.

8. The active redirection system of claim 1, wherein the control module further comprises a memory storing mappings for control settings to reflection directions.

9. The active redirection system of claim 1, wherein the reflective elements comprise a reflector element, a dipole element, or a miniature reflector element.

10. The active redirection system of claim 1, further comprising a repeater adapted to redirect signals from a transmitter to a receiver.

11. The active redirection system of claim 10, wherein the control module is adapted to direct the reflectarray and the repeater in a same direction.

12. An active redirection device, comprising:
an array of radiating elements;
a beam control module coupled to the array, comprising:
a phase shift module; and
a gain control module; and
a plurality of passive redirection devices each having a respective reflection phase, wherein the plurality of passive redirection devices are configured to generate a plurality of radio frequency (RF) beams, wherein the active redirection device is configured to reflect millimeter wave signals.

13. The active redirection device as in claim 12, wherein the beam control module is adapted to control a directivity of a beam from the array.

14. The active redirection device as in claim 12, wherein the array is configured as a plurality of subarrays.

15. The active redirection device as in claim 14, wherein the beam control module is adapted to control a directivity in a first direction for a first subarray and a second direction for a second subarray.

16. The active redirection device as in claim 15, wherein the active redirection device is adapted for transmission of directed wireless communication signals.

17. The active redirection device as in claim 12, further comprising:
a plurality of transmitters, each adapted to transmit a signal at a different phase shifts, wherein signals from the plurality of transmitters are distinguishable at a receive module.

18. The active redirection device as in claim 17, wherein the active redirection device is part of a virtual MIMO system.

19. An active redirection system, comprising:
a redirection device of reflective elements having sizes, shapes and configurations configured to generate a first phase distribution across the redirection device, the first phase distribution having a first reflection direction;
a control module coupled to the redirection device and adapted to provide energy to one or more reflective elements to generate a second phase distribution across the redirection device, the second phase distribution having a second reflection direction; and
a repeater adapted to redirect signals from a transmitter to a receiver,
wherein the active redirection device is configured for reflecting millimeter wave signals, and
wherein the active redirection device is configured to operate as a relay between a source and the receiver to spread the RF signal, thereby increasing a coverage area of the source.

* * * * *